United States Patent
Olson et al.

(10) Patent No.: US 8,490,053 B2
(45) Date of Patent: Jul. 16, 2013

(54) SOFTWARE DOMAIN MODEL THAT ENABLES SIMULTANEOUS INDEPENDENT DEVELOPMENT OF SOFTWARE COMPONENTS

(75) Inventors: Keith A. Olson, Livermore, CA (US); Jeffrey M. Collins, San Mateo, CA (US); Calum G. Murray, Santa Rosa, CA (US); Gerald B. Huff, Berkeley, CA (US); Devin W. Breise, La Jolla, CA (US)

(73) Assignee: Intuit Inc., Mountain View, CA (US)

( * ) Notice: Subject to any disclaimer, the term of this patent is extended or adjusted under 35 U.S.C. 154(b) by 1807 days.

(21) Appl. No.: 11/585,511

(22) Filed: Oct. 23, 2006

(65) Prior Publication Data

US 2008/0098348 A1    Apr. 24, 2008

(51) Int. Cl.
    *G06F 9/44*    (2006.01)
(52) U.S. Cl.
    USPC .......................................................... 717/120
(58) Field of Classification Search
    USPC ......................................... 717/100, 120–123
    See application file for complete search history.

(56) References Cited

U.S. PATENT DOCUMENTS

| | | | | |
|---|---|---|---|---|
| 6,199,195 B1 * | 3/2001 | Goodwin et al. | ............. | 717/104 |
| 6,401,077 B1 * | 6/2002 | Godden et al. | ................... | 705/26 |
| 6,405,363 B1 * | 6/2002 | Carlson et al. | ................ | 717/100 |
| 6,944,845 B2 * | 9/2005 | Graser et al. | ................... | 717/116 |
| 7,051,119 B2 * | 5/2006 | Shafron et al. | ................ | 709/248 |
| 7,152,228 B2 * | 12/2006 | Goodwin et al. | ............. | 717/146 |
| 7,185,325 B2 * | 2/2007 | Boyle | ............................ | 717/147 |
| 7,594,166 B1 * | 9/2009 | Ramakrishna et al. | ........ | 715/234 |
| 7,657,870 B2 * | 2/2010 | Berg et al. | ...................... | 717/120 |
| 7,707,550 B2 * | 4/2010 | Resnick et al. | ................ | 717/121 |
| 2002/0023261 A1 * | 2/2002 | Goodwin et al. | ............. | 717/146 |
| 2003/0051229 A1 * | 3/2003 | Boyle | ............................ | 717/116 |
| 2003/0236576 A1 * | 12/2003 | Resnick et al. | .................... | 700/9 |
| 2006/0101445 A1 * | 5/2006 | Carbajales et al. | ........... | 717/165 |

OTHER PUBLICATIONS

Jamil et al., "An Object-Oriented Extension of XML for Autonomous Web Applications," Nov. 2002, ACM, p. 161-168.*
JBoss jBPM 3.1, Chapter 4—Graph Oriented Programming [online, retrieved on Oct. 12, 2006 from http://docs.jboss.com/jbpm/v3/userguide/graphorientedprogramming.html].
Windows Workflow Foundation Overview [online, retrieved on Oct. 12, 2006 from http://msdn2.microsoft.com/en-us/netframework/aa663340.aspx].
Web Services and Service-Oriented Architectures [online, retrieved on Oct. 12, 2006 from http://www.service-architecture.com/].

* cited by examiner

*Primary Examiner* — Qing Chen
(74) *Attorney, Agent, or Firm* — Park, Vaughan, Fleming & Dowler, LLP; Mark Spiller

(57) ABSTRACT

One embodiment of the present invention provides a software domain model that enables simultaneous independent development of software components. A system using this model includes a first component, a second component, and a core layer that defines an item that can be accessed by the first and second components. Both components are able to independently and separately extend the definition of the item. A high-level software layer uses a set of micro-orchestrations to perform a holistic task, with each micro-orchestration invoking a piece of functionality in a component, the core layer, and/or the software layer.

18 Claims, 4 Drawing Sheets

SOFTWARE DOMAIN MODEL THAT ENABLES SIMULTANEOUS INDEPENDENT DEVELOPMENT OF SOFTWARE COMPONENTS

BACKGROUND

Related Art

The present invention relates generally to the problem of using independently-developed software components to perform a holistic task.

As computer technology has evolved, software has grown in sophistication to support a wide variety of applications and to provide a wide range of features. However, software applications are generally designed monolithically, with little or no reuse of infrastructure or business logic.

Unfortunately, such monolithic design techniques can severely limit the scalability of both the development team size as well as application features. For instance, it is difficult to efficiently use large development teams to extend applications which are designed around monolithic architectures. Furthermore, producing applications with adjustable levels of complexity that can address business opportunities for a wide range of customers can be difficult. Other issues include low levels of code reuse, low productivity within development teams, difficulty in achieving product quality, and high code impedance (i.e., a high likelihood of a developer introducing additional software bugs while trying to fix existing software bugs).

SUMMARY

One embodiment of the present invention provides a software domain model that enables simultaneous independent development of software components. A system using this model includes a first component, a second component, and a core layer that defines an item that can be accessed by the first and second components. Both components are able to independently and separately extend the definition of the item. A high-level software layer uses a set of micro-orchestrations to perform a holistic task, with each micro-orchestration invoking a piece of functionality in a component, the core layer, and/or the software layer.

In a variation on this embodiment, a component in the system extends the item by extending a data definition for the item and/or extending a set of behaviors associated with the item.

In a further variation, a micro-orchestration characterizes a behavior of a component, the core layer, and/or the software layer.

In a further variation, the system combines a data definition for the first component and a data definition for the second component to provide a combined data definition for the item. The system can also combine a behavior of the first component and a behavior of the second component to perform the holistic task.

In a further variation, the first component and the second component are designed independently in a de-coupled manner. In this variation, the second component cannot access the extended definition of the item in the first component, and vice versa.

In a further variation, modifying the first component does not affect the second component, and vice versa. Moreover, the first component and the second component can share and independently extend the item without changing the core layer.

In a further variation, the system uses a micro-orchestration to send data from the first component to the second component without the first component knowing of the second component nor the second component knowing of the first component.

In a further variation, a micro-orchestration serves as a granular form of meta-data that performs a discrete unit of business logic for a holistic task. Such a micro-orchestration can be triggered in response to a system event.

In a further variation, a third component provides additional functionality over the second component and may extend the item beyond the extended definition of the second component. The system can replace the second component with this third component without changing the first component and the core layer.

In a further variation, while replacing the second component with the third component, the system accommodates for the functionality of the third component by updating the set of micro-orchestrations for the holistic task.

In a further variation, changing components allows a group of products and/or services that are built on the core layer to add functionality without changing the core layer. Such a flexible framework, which provides de-coupled components that are accessed using micro-orchestrations, facilitates changing and/or extending the core layer in a component without affecting other products and/or services in the group.

In a variation on this embodiment, the system can extend an item by extending all items of the same type to include an extended functionality. Alternatively, the system can extend an item such that only items of the same type in a single software component include the extended functionality.

In a further variation, a micro-orchestration can involve one or more of the following: setting up an operation or data; ensuring that a set of business object state and/or data is configured for the operation; executing the operation; and/or performing an action after the operation has executed.

In a further variation, designing the first component and the second component independently enables simultaneous independent development of product components. Despite independent development, the two components, each with a different data definition and set of behaviors, can work in concert to perform the holistic task.

DETAILED DESCRIPTION

Figure 1:
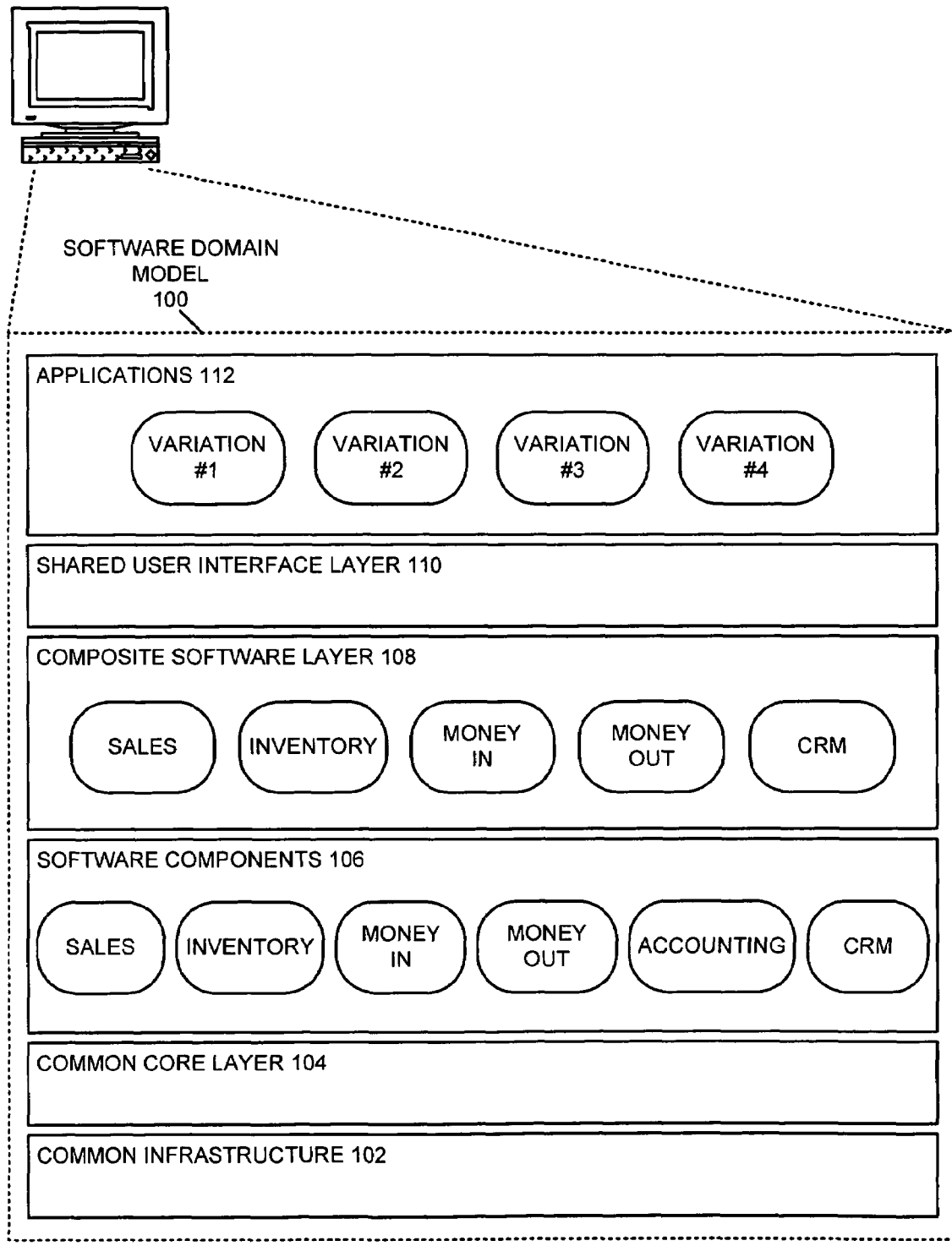
FIG. 1 illustrates a software domain model that supports independent software components in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Software Evolution and Development

Although creating a software solution for a small set of customers is relatively straightforward, creating a solution for a range of diverse customers, for instance in the small business domain, can be challenging. For small business software, the wide range of business needs creates demand for a wide range of features for applications. In such an application space, a software provider might want to produce software solutions that can be customized or combined for desired customers. For instance, in a financial software application, customers might want different options or levels of functionality for categories such as sales, payroll, invoicing, inventory management, etc. In another example, the types of invoicing can encompass: no inventory (for a service-based business such as a law office); simple inventory; wholesale inventory; retail inventory (for a shop); and/or multi-location warehouse inventory (for a supplier with multiple sites). Providing the "most sophisticated" solution to customers by default might discourage the adoption of a software application, because more sophisticated solutions might provide undesired detail and complexity. Customers typically desire a level of functionality that is "right for me," but can also be adapted or upgraded to accommodate future needs.

Monolithic software design often prevents software applications from being easily customized to provide multi-faceted, adjustable functionality. For instance, the addition of new functionality often changes and/or adds new requirements to the underlying domain model, thereby potentially cascading changes throughout other modules of the application. Also, monolithic software typically has inter-dependencies that hinder the large-scale reuse of code and efficient parallel development of features using multiple development teams. For example, an underlying core platform might comprise 60% of the application code, thereby making it very difficult to change the core platform without breaking something else. An improved solution would allow each component to independently extend and "own" a separate set of data definitions and behavior.

In one embodiment of the present invention, a software domain model de-couples software components to enable simultaneous development, which facilitates changing software and increasing functionality. This software domain model provides highly-decoupled business logic and a flexible framework via independently-developed components that are built upon a common core layer. Applications built upon this model can handle changing requirements without affecting other products built upon the common core layer. This functionality is achieved using de-coupled software components that can be tied together using a set of behavior specifications called "micro-orchestrations."

A Software Domain Model for Independent Components

FIG. 1 illustrates a software domain model 100 that supports independent software components. As is illustrated in FIG. 1, a common core layer 104 that provides a shared set of definitions is built on top of a set of common infrastructure 102. This common core layer 104 provides a small set of common definitions, attributes, and relationships that apply generally to all applications in the application domain and are used by a set of software components 106. A composite software layer 108 ties together the behavior of such components to perform a holistic task. These tasks are triggered by a varied set of applications 112 that make calls to the composite software layer 108 via a shared user interface layer 110.

Note, however, that unlike typical software systems, each software component 106 is developed independently. This means that developers of a software component 106 can use and extend the capabilities from the common core layer 104 within the scope of the component without additional interaction or negotiation with the developers of other components. Moreover, each component remains unaware of the functionally of and changes to the other components.

Although the software components 106 can be developed independently, their functionality can be tied together by the higher-level composite software layer 108 to perform a holistic task. For instance, a financial software application may include specialized components for sales, inventory, money in, money out, accounting, and custom relationship management (CRM). While each of these components is self-contained and provides functionality for a specific function, higher-level tasks in the application may involve multiple components. Because the components are unaware of each other, higher-level modules in the composite software layer 108 are used to define and guide tasks that involve multiple components. To achieve such integration, the software domain model uses a micro-orchestration for each task.

A micro-orchestration is defined as a series of discrete steps, or behaviors, that specify a flow of control for a discrete functional business logic operation. Micro-orchestrations are typically fired in response to certain events in a system, such as a user action that results in: executing a piece of business logic; creating, reading, updating, or deleting a domain object; and/or changing a property of a domain object. A micro-orchestration combines a set of behavioral operations used to execute a given task into a single piece of meta-data. Each step in a micro-orchestration is a discrete business logic operation called an "atom," and invoking the micro-orchestration can result in atoms being executed, for instance, in composite software layer 108, in software component 106, or in common core layer 104. The micro-orchestration specifies the order in which the included atoms will be executed. Moreover, atoms may fall into a set of phases including, but not limited to:

- a pre-validate step, during which atoms are set up;
- a validate step, during which business object state and data are checked to ensure correctness;
- an execution phase, during which an operation is carried out; and/or
- a post-execution phase, during which post-operation atoms, such as atoms sending notification, are executed.

Each phase may include multiple atoms which execute in sequential order. Using atoms allows tasks to be split up into primitives which can be logically separated, and hence developed independently. Note that atoms can pass data from one atom to another.

In one embodiment of the present inventions, micro-orchestrations can be defined and deployed using a variety of techniques. For instance, a micro-orchestration can be defined using an XML-based design language that can be interpreted, pre-compiled into byte code, or compiled as-needed using a just-in-time (JIT) compiler. Note that a single micro-orchestration may contain several definitions. Micro-orchestrations can also call other micro-orchestrations, or include conditional logic that determines whether or not to execute a given atom.

Figure 2A:
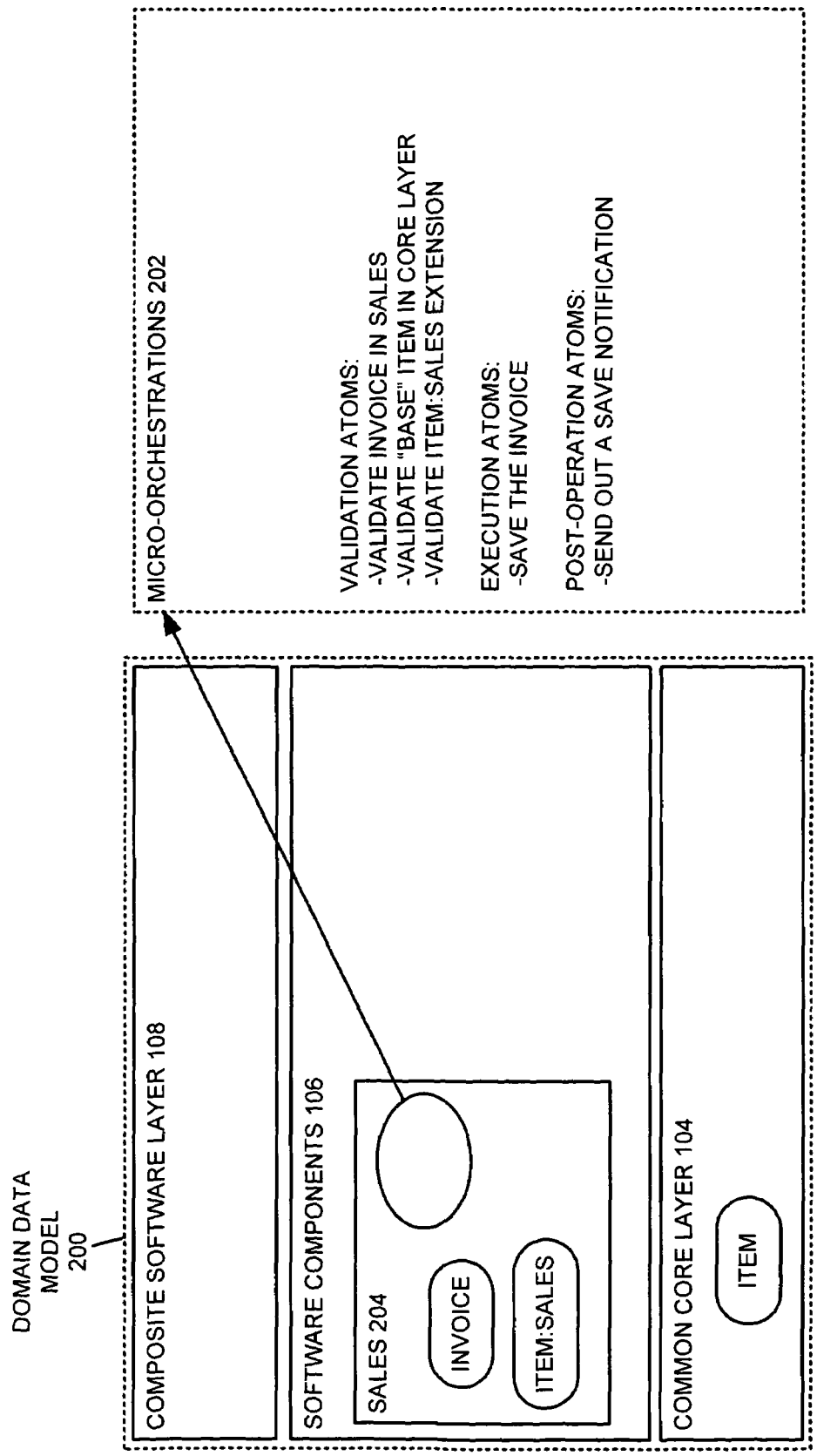
FIG. 2A illustrates a domain data model and a micro-orchestration used for saving an invoice in a simple financial software application in accordance with an embodiment of the present invention.
Figure 2B:
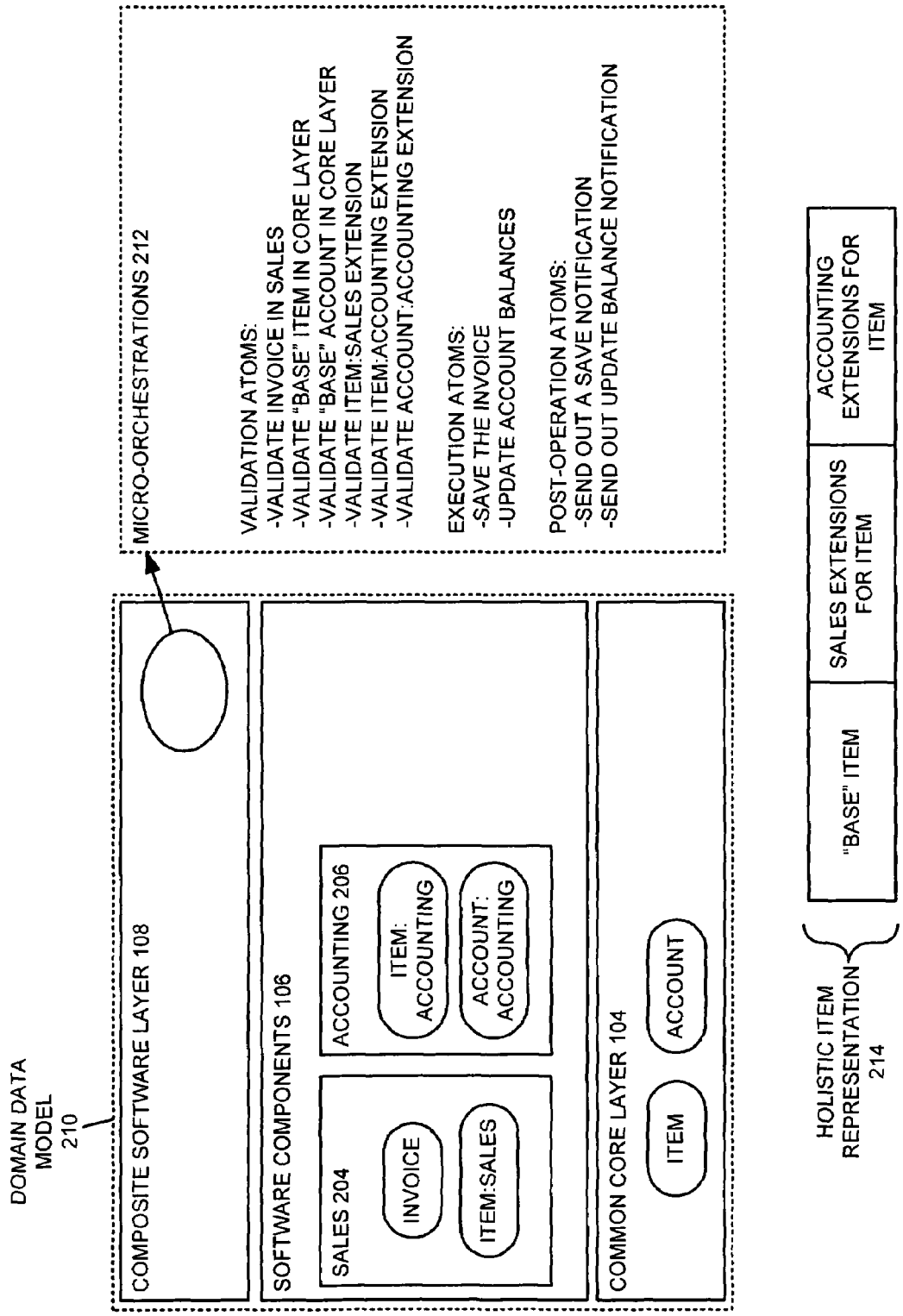
FIG. 2B illustrates a domain data model and a micro-orchestration used for saving an invoice in a financial software application that uses two software components in accordance with an embodiment of the present invention.
Figure 2C:
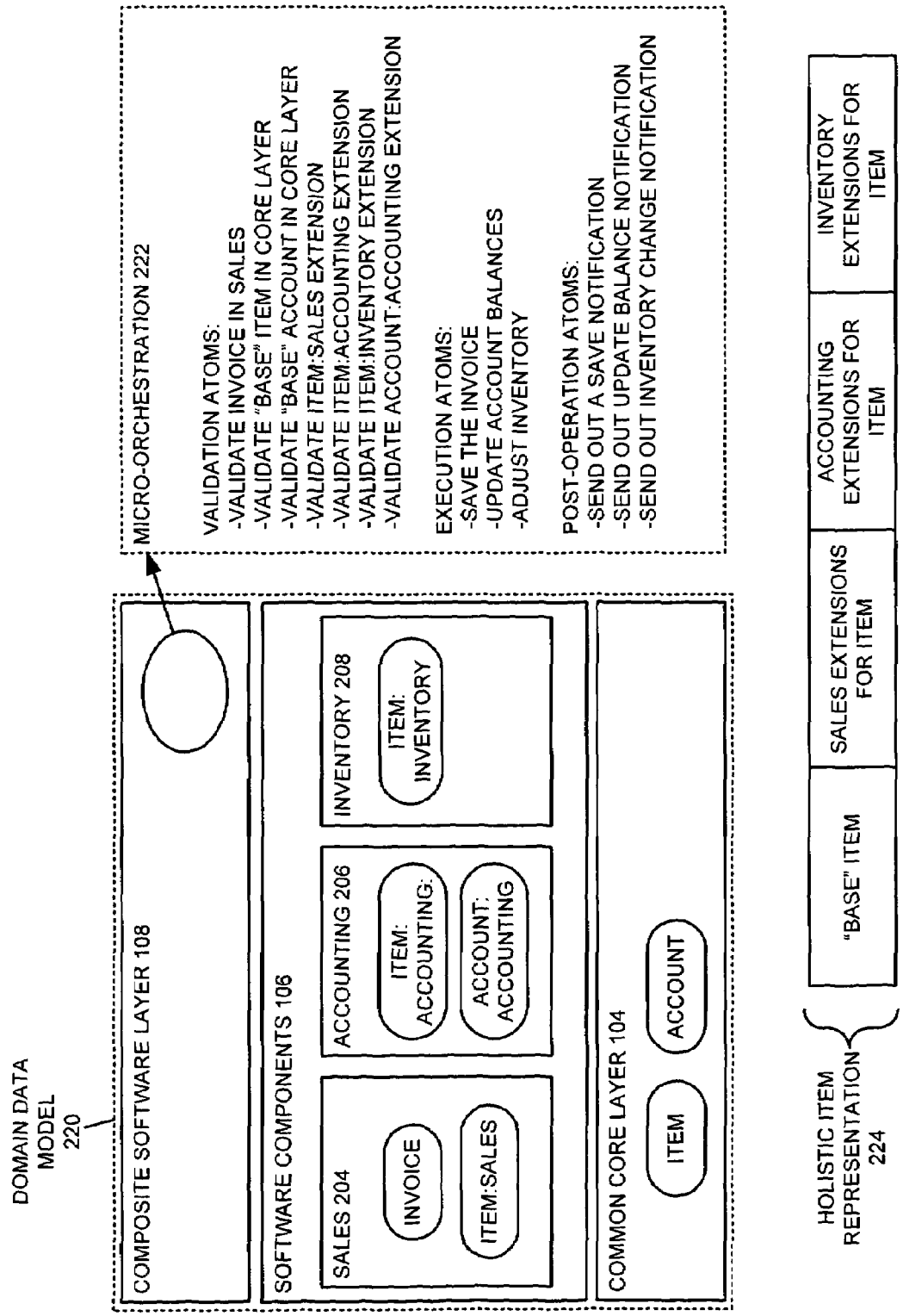
FIG. 2C illustrates a domain data model and a micro-orchestration used for saving an invoice in a financial software application that uses three software components in accordance with an embodiment of the present invention.

FIGS. 2A-2C illustrate three examples in which items in the common core layer are extended and used in three different system configurations.

More specifically, FIG. 2A illustrates a domain data model 200 and a micro-orchestration 202 used for saving an invoice in a simple financial software application that uses only a single sales component 204. The sales component 204 extends the data and/or behavior for the item type defined in the common core layer 104 to include additional fields and functionality related to selling an item. The sales component 204 also defines an invoice data type internally, for instance to provide a set of fields and functionality related to printing a list of items sold and sending the list to a customer.

The micro-orchestration 202 in FIG. 2A illustrates the set of atoms that execute during the process of saving an invoice. First, the system validates business object state and data by confirming that: (1) the data corresponding to the invoice in the sales component 204, (2) the "base" item in the common core layer 104, and (3) the extended item in the sales component 204 are valid. Validation may involve checking that a piece of data is properly initialized, and/or that a set of relationships between several pieces of data is correct. Next, the system performs an operation to actually save the invoice. Finally, the system completes the task by sending a save notification during a post-execution operation. Note that in FIG. 2A the meta-data for the micro-orchestration 202 can be defined and "known" in the context of the sales component 204. Because the system only includes the single component, the composite software layer 108 is not needed to tie together operations between multiple components.

FIG. 2B illustrates a domain data model 210 and a micro-orchestration 212 used for saving an invoice in a financial software application that uses both a sales software component 204 and an accounting software component 206. Adding the accounting component 206 allows the application to add accounting credits and debits based on invoice operations. The accounting component 206 extends the data and behavior for the item type and an account data type defined in the common core layer 104. Note that the two sets of extensions to the item type, one in the sales component 204 and one in the accounting component 206, are completely separate and decoupled. The sales component is unable to see the extensions in the accounting component 206, and vice versa. However, the composite software layer 108 is able to access a holistic representation of the item 214 and all of the item's extensions. Also, note that the accounting component 206 is completely additive; the functionality of the application is increased without changing the data or behavior of the sales component 204. Micro-orchestration 212, however, needs to be extended to support the added functionality.

Micro-orchestration 212 in FIG. 2B illustrates a set of atoms that combine the functionality of both components for the process of saving an invoice. For this configuration, when saving an invoice, the system also updates account balances using the accounting component 206. This is accomplished as follows. First, the system performs a set of validations. In addition to the set of validations in FIG. 2A, the system validates additional business object state and data by confirming that data corresponding to the "base" account in the common core layer 104, the extended item in the accounting component 206, and the extended account in the accounting component 206 are correct. Next, after saving the invoice using the sales component 204, the system also updates account balances to reflect the sale in the accounting component 206. Finally, the system completes the task by sending out both a save notification and a notification of a balance update in a set of post-execution operations.

Note that in FIG. 2B, the meta-data representing the micro-orchestration 212 has moved up from the sales component 204 (in FIG. 2A) to the composite software layer 108. While the common task of saving an invoice is still primarily associated with the sales component 204, these operations now also trigger changes in the accounting component 206. Because the two components do not know of each other, the micro-orchestration might instead be stored and triggered from a "sales" module (as shown in FIG. 1) in the higher-level composite software layer 108, which ties together the functionality of the two independent components. Note, however, that while atoms may be triggered from the composite software layer 108, the actual behavior for a specific atom is typically found in the component or layer where the atom is defined. For instance, the atom that validates the invoice in sales typically would be found in the sales component 204.

The higher-level composite software layer 108 can also identify an item to a software component or can pass data from one software component to another using atoms. For instance, the "common" fields of an item shared across the software components 106 in FIG. 2B, for instance, may be used by the micro-orchestration to identify the item for the different software components 106, without the components having to be aware of one another. In another example, a set of atom in the micro-orchestration might gather an item type, ID, quantity, and price from sales 204, and might pass the data to a general interface provided by accounting 206. In this example, accounting doesn't need to know where the price came from, only that the accounts receivable should be updated appropriately.

FIG. 2C illustrates a domain data model 220 and a micro-orchestration 222 used for saving an invoice in a financial software application that uses a sales software component 204, an accounting software component 206, and an inventory component 208. Adding the inventory component 208 allows the application to automatically update the quantity-on-hand when items are sold. The inventory component 208 extends the data and behavior for the item type within the domain of the inventory component 208, hence further extending the holistic representation of the item 224 that can be accessed by the composite software layer 108. As noted previously with reference to FIG. 2B, adding the new software component 106 and extending the micro-orchestration 222 allows the functionality of the application to be increased without changing the data or behavior of the sales component 204 and accounting component 206.

Micro-orchestration 222 in FIG. 2C further extends the set of atoms from FIGS. 2A-2B by adding atoms that: validate the extended item in the inventory component 208; adjust the inventory during execution; and send out an inventory change notification after the execution phase.

In one embodiment of the present invention, a software component used by an application can be replaced by a second component that provides additional functionality while requiring only minimal changes to the application and no changes to the other components or common core layer 104. Because the software components of the application are independent, such a change does not change the other components, but instead updates the micro-orchestrations to reflect the behavior of the replacement component. By pre-defining a set of micro-orchestrations for each potentially-desired configuration for a set of available software components, application developers can facilitate development of a family of applications with varying degrees of functionality. If additional functionality, such as automatic accounting support, is desired, the application can easily be upgraded using a new component and a corresponding set of updated micro-orchestrations.

Extending Data and Behavior Definitions

In one embodiment of the present invention, a set of core common building blocks are defined in the common core layer 104 and then extended by components. These components can extend data elements and/or behavior using several techniques. In one such extension technique, known as "morphing," a component can extend a data element so that all data elements of that type throughout the entire system are extended. For instance, in the previous example (shown in FIG. 2B), the accounting component 206 morphs an item to include accounting fields, thereby effectively extending all items in the system to include accounting fields. Note, however, that while all items now include these fields, only the composite software layer, and not the individual (non-accounting) components, are directly aware of these additional fields.

Another extension technique, known as "specialization," allows a component to extend an element such that only items of the new extended type internal to the component include the additional functionality. For instance, a payroll component that specializes an item into a "payroll item" that includes additional payroll-related fields extends only payroll items, and not all items in the system, to include the payroll fields. This technique can limit the extension for situations where the additional data and behaviors only apply to a limited set of objects in one component.

Simultaneous Independent Development

The described software domain model allows development teams to work on components independently, and to then easily integrate their outputs into a common application using micro-orchestrations. Micro-orchestrations prevent developers from having to know the API of every component they might interact with, thereby reducing the amount of interdependency between teams and improving the scalability of software. Furthermore, the ability to easily switch components to create different application configurations provides significant benefits by promoting large-scale reuse of components. By supporting simultaneous independent development of software capabilities, the domain model improves software extensibility and developer productivity.

In one embodiment of the present invention, a set of development tools support the software domain model. For instance, a development team may use a tool that simplifies adding additional fields to the base functionality provided by the common core layer 104. Another higher-level tool may also be used to analyze the extended behaviors for a set of components and to assist in organizing sets of atoms into a range of micro-orchestrations for multiple application configurations.

In summary, in one embodiment of the present invention a software domain model provides a flexible framework in which de-coupled components can be built on a common base domain model. The components can independently extend the data definitions and behaviors of the base domain model, but can still be tied together to perform a holistic task by using a set of micro-orchestrations. These micro-orchestrations enable extensibility by allowing components to work together without having to communicate directly, unlike in previous monolithic domain models. While the de-coupled components still share the base set of definitions of the base domain model, this base domain model no longer needs functionality to support all of the components, thereby allowing the shared layer to be much thinner than in existing software domain models. Decoupling components from one another: (1) allows the software domain model to be very extensible; (2) prevents changes to the base domain model from causing cascading changes; (3) facilitates building a family of applications with varying functionality from a pool of components; and (4) enables simultaneous independent development of components by geographically-distributed design teams.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer system, comprising:
   a processor; and
   a non-transitory computer-readable storage medium storing a software domain model, wherein the software domain model comprises:
   a common core layer providing a set of common elements, wherein the set of common elements comprise definitions, attributes, behaviors, and relationships;
   a software layer providing a first software component and a second software component that independently and separately extend a common element in the set of common elements provided by the common core layer, wherein the first software component is different from the second software component; and
   a composite software layer including a set of micro-orchestrations, which when executed, cause the computer system to invoke functionalities in the first software component and the second software component to collectively perform a task,
   wherein a micro-orchestration in the set of micro-orchestrations included in the composite software layer is used to send data from the first software component to the second software component, without the first software component knowing of the second software component, and without the second software component knowing of the first software component.

2. The computer system of claim 1, wherein extending the common element involves at least one of: extending a data definition for the common element, and extending a set of behaviors associated with the common element.

3. The computer system of claim 2, wherein a micro-orchestration in the set of micro-orchestrations included in the composite software layer characterizes a behavior of at least one of: the first and second software components, the common core layer, and the composite software layer.

4. The computer system of claim 3, wherein invoking functionalities in the first software component and the second software component involves:
   combining a first extended data definition for the first software component and a second extended data definition for the second software component to provide a combined data definition for the common element; and
   combining a behavior of the first software component and a behavior of the second software component.

5. The computer system of claim 4, wherein a third software component provides an additional functionality over the second software component, and extends the common element beyond the second extended data definition; and
wherein the second software component is replaced by the third software component without changing the first software component and the common core layer.

6. The computer system of claim 5, wherein replacing the second software component with the third software component involves updating the set of micro-orchestrations for the task to accommodate the additional functionality of the third software component.

7. The computer system of claim 6,
wherein changing components allows a group of products and services that are built on the common core layer to add functionality without changing the common core layer; and
wherein a flexible framework with software components that are accessed using the set of micro-orchestrations facilitates changing and extending the common core layer without affecting other members in the group of products and services.

8. The computer system of claim 3, wherein a micro-orchestration in the set of micro-orchestrations included in the composite software layer involves one or more of the following:
setting up an operation or data;
ensuring that a set of business object state and data are configured for the operation;
executing the operation; and
performing an action after the operation has executed.

9. The computer system of claim 2, wherein the first software component extends the common element by:
extending the common element such that all elements of the same type as the common element include an extended functionality; or
extending the common element such that only elements of the same type in the first software component include the extended functionality.

10. The computer system of claim 1, wherein a micro-orchestration in the set of micro-orchestrations included in the composite software layer serves as a granular form of meta-data that performs a discrete unit of business logic; and wherein a micro-orchestration in the set of micro-orchestrations included in the composite software layer is triggered in response to a system event.

11. A method for using independent software components in a computer system to perform a task, the method comprising:
storing, in the computer system, a set of micro-orchestrations that performs a task in a composite software layer, wherein a micro-orchestration in the set of micro-orchestrations in the composite software layer invokes a piece of functionality in one or more of: the independent software components, a common core layer, and the composite software layer;
executing, in the computer system, a first micro-orchestration in the set of micro-orchestrations in the composite software layer, wherein the first micro-orchestration invokes a functionality in a first software component, wherein the first software component has independently and separately extended a common element in the common core layer, and wherein the common element comprises at least one of definitions, attributes, behaviors, and relationships; and
executing, in the computer system, a second micro-orchestration in the set of micro-orchestrations in the composite software layer, wherein the second micro-orchestration invokes a functionality in a second software component, wherein the second software component is different from the first software component, and wherein the second software component has independently and separately extended the common element in the common core layer; and
wherein executing the first micro-orchestration and the second micro-orchestration in the set of micro-orchestrations in the composite software layer collectively performs the task in the composite software layer, and wherein a micro-orchestration in the set of micro-orchestrations in the composite software layer is used to send data from the first software component to the second software component, without the first software component knowing of the second software component, and without the second software component knowing of the first software component.

12. The method of claim 11, wherein a micro-orchestration in the set of micro-orchestrations in the composite software layer characterizes a behavior of at least one of: the first and second software components, the common core layer, and the composite software layer.

13. The method of claim 12, wherein invoking functionalities in the first and second software components to perform a task involves at least one of:
combining a first extended data definition for the first software component and a second extended data definition for the second software component to provide a combined data definition for the common element; and
combining a behavior of the first software component and a behavior of the second software component to perform the task.

14. The method of claim 11, wherein a micro-orchestration in the set of micro-orchestrations in the composite software layer serves as a granular form of meta-data that performs a discrete unit of business logic for the task; and wherein a micro-orchestration in the set of micro-orchestrations in the composite software layer is triggered in response to a system event.

15. A non-transitory computer-readable storage medium storing instructions that when executed by a computer cause the computer to perform a method for using independent software components in a computer system to perform a task, the method comprising:
storing, in the computer system, a set of micro-orchestrations that performs a task in a composite software layer, wherein a micro-orchestration in the set of micro-orchestrations in the composite software layer invokes functionalities in one or more of: the independent software components, a common core layer, and the composite software layer;
executing, in the computer system, a first micro-orchestration in the set of micro-orchestrations in the composite software layer, wherein the first micro-orchestration invokes functionalities in a first software component, wherein the first software component has independently and separately extended a common element in the common core layer, and wherein the common element comprises at least one of definitions, attributes, behaviors, and relationships; and
executing, in the computer system, a second micro-orchestration in the set of micro-orchestrations in the composite software layer, wherein the second micro-orchestration invokes functionalities in a second software component, wherein the second software component is different from the first software component, and wherein the second software component has independently and separately extended the common element in the common core layer; and wherein executing the first micro-orchestration and the second micro-orchestration in the set of micro-orchestrations in the composite software layer collectively performs the task in the composite software layer, and wherein a micro-orchestration in the set of micro-orchestrations in the composite software layer is used to send data from the first software component to the second software component, without the first software component knowing of the second software component, and without the second software component knowing of the first software component.

16. A method for simultaneous independent development of software components from a common core layer in a computer system, comprising:

extending, in the computer system, a common element by a first software component, wherein the common element is defined in the common core layer, and wherein the common element comprises at least one of definitions, attributes, behaviors, and relationships; and extending, in the computer system, the common element by a second software component, wherein the second software component is different from the first software component, and wherein the second software component extends the common element independently and separately from the first software component; and wherein a composite software layer uses the first and second software components to collectively perform a task through a set of micro-orchestrations, wherein a micro-orchestration in the set of micro-orchestrations invokes functionalities in one or more of: the first and second software components, the common core layer, and the composite software layer, and wherein a micro-orchestration in the set of micro-orchestrations is used to send data from the first software component to the second software component, without the first software component knowing of the second software component, and without the second software component knowing of the first software component.

17. The method of claim 16, wherein using the first and second software components to collectively perform a task involves at least one of:

combining a first extended data definition for the first software component and a second extended data definition for the second software component to provide a combined data definition for the common element; and combining a behavior of the first software component and a behavior of the second software component to collectively perform the task.

18. The method of claim 16, wherein the first software component extends the common element by:

extending the common element such that all elements of the same type as the common element include an extended functionality; or extending the common element such that only elements of the same type in the first software component include the extended functionality.

* * * * *